Aug. 1, 1944.　　　R. N. FALGE ET AL　　　2,354,804
MOTOR VEHICLE LAMP
Filed July 14, 1942　　　2 Sheets-Sheet 1

Inventors
Robert N. Falge &
Howard C. Mead
By Blackmore, Spencer & Hiett
Attorneys

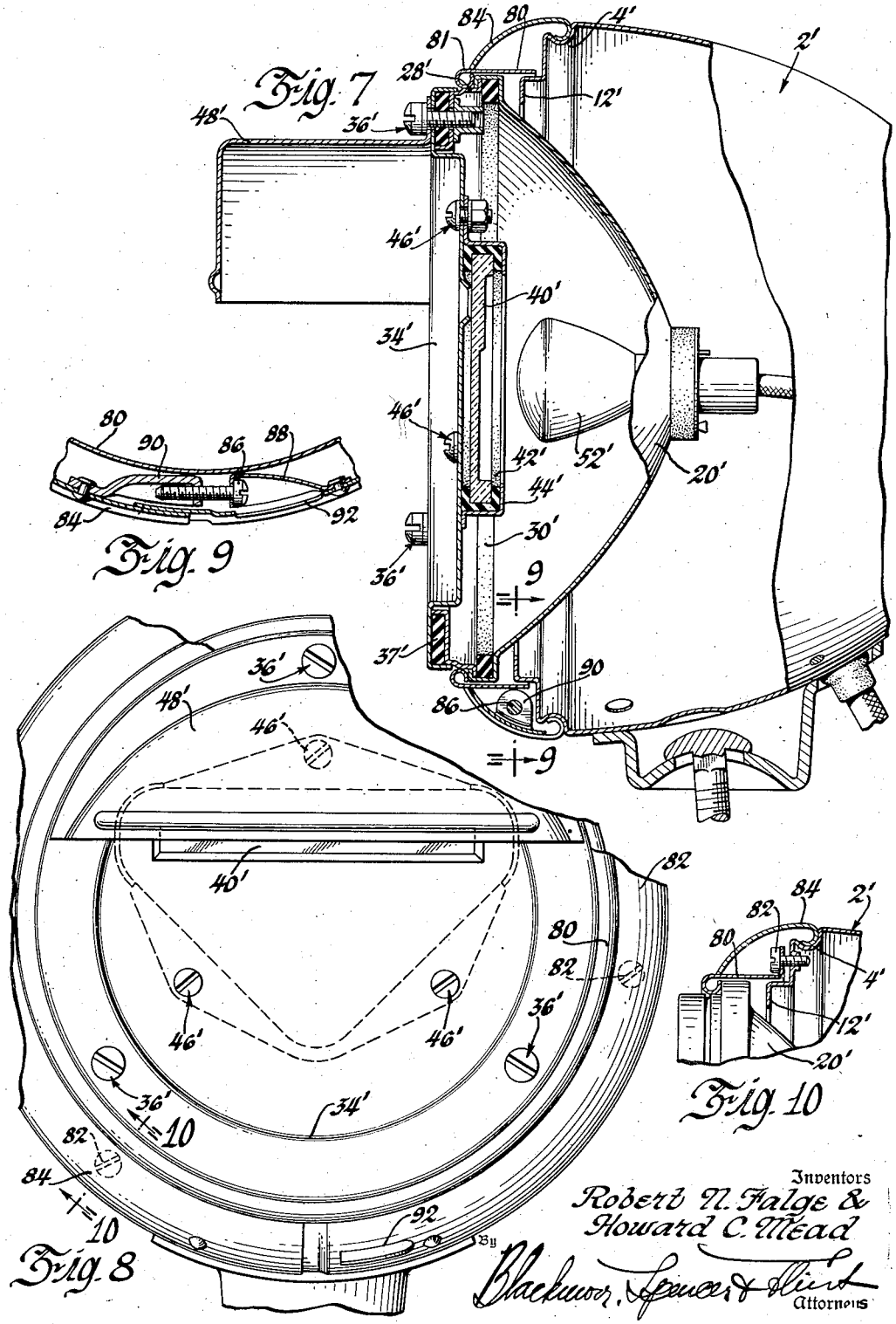

Patented Aug. 1, 1944

2,354,804

UNITED STATES PATENT OFFICE 2,354,804

MOTOR VEHICLE LAMP

Robert N. Falge and Howard C. Mead, Anderson, Ind., assignors to General Motors Corporation, Detroit, Mich., a corporation of Delaware Application July 14, 1942, Serial No. 450,894

3 Claims. (Cl. 240—48.4)

The present invention relates generally to motor vehicle lamps and more particularly to headlamp construction which is primarily adapted for use on military or other vehicles which may be operated during wartime in locations or at times in which it is desirable to minimize the risk of observation from above by enemy aircraft.

It has heretofore been the general practice on such vehicles to provide the standard types of headlamps for use when there is no danger of observation by enemy aircraft to facilitate rapid travel with maximum visibility and also provide various types of accessory blackout lamps which afford very little illumination and are so constructed as to minimize detection from above for use in combat zones or at such times as presence of enemy aircraft may be expected.

The principal object of the present invention is to avoid the necessity of providing the additional accessory blackout lamps and permit the use of only the standard headlamps which may be readily converted for blackout use by providing a specially constructed blackout unit assembly which may be readily substituted for or interchanged with the present day commercially standard lighting units.

It is therefore a further object to so construct the blackout unit assembly as to facilitate the substitution thereof in standard types of headlamps for the usual lighting unit and to provide a construction of the blackout unit assembly which affords the maximum permissible illumination with suitable light directing and shielding means to minimize observation from above.

A still further object is to provide a construction of the blackout unit assembly which is simple but which will afford adequate sealing and protection of certain parts and also permit replacement of the light source without removal of the entire assembly from the lamp housing.

Other objects and the advantages of the present invention will be hereinafter mentioned or will be apparent from the following description of the two embodiments illustrated in the accompanying drawings in which:

Figure 7 is a side elevation of another embodiment with parts broken away and shown in section.

Figure 8 is a fragmentary front elevation of the lamp of Figure 7.

Figure 9 is a fragmentary section taken substantially on line 9—9 of Figure 7.

Figure 10 is a sectional view of a detail of the lamp of Figure 7, taken substantially on line 10—10 of Figure 8.

Figure 3:
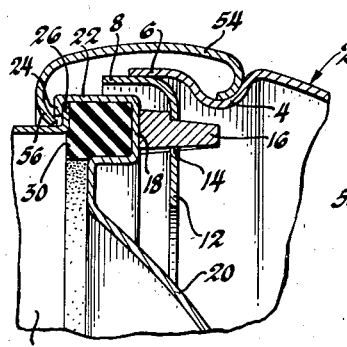
Figure 3 is an enlarged section taken substantially on line 3—3 of Figure 2.

Referring first to the embodiment shown in Figures 1 to 4, the lamp housing 2 of the usual bowl-shaped configuration is shown as formed with a shallow circumferential channel 4 adjacent the front open end thereof with a flange portion 6 extending forwardly beyond the channel 4. A mounting ring 8 is secured as by rivets 10 to the flange 6 and is formed with an integral inwardly extending portion 12 having a plurality of spaced openings 14 to receive radial positioning lugs 16 extending rearwardly from the offset flange 18 of a reflector 20. The reflector 20 is extended forwardly of the flange 18 as shown at 22 and the front edge of the portion 22 is adapted to be bent inwardly or spun over to form an inwardly extending lip 24 which extends around an outwardly projecting flange 26 on a cylindrical support 28 with a resilient gasket 30 of suitable material such as rubber clamped between the flange 26 and the adjacent offset portions of the reflector 20 as shown to seal the joint between the support 28 and reflector 20.

Figure 1:
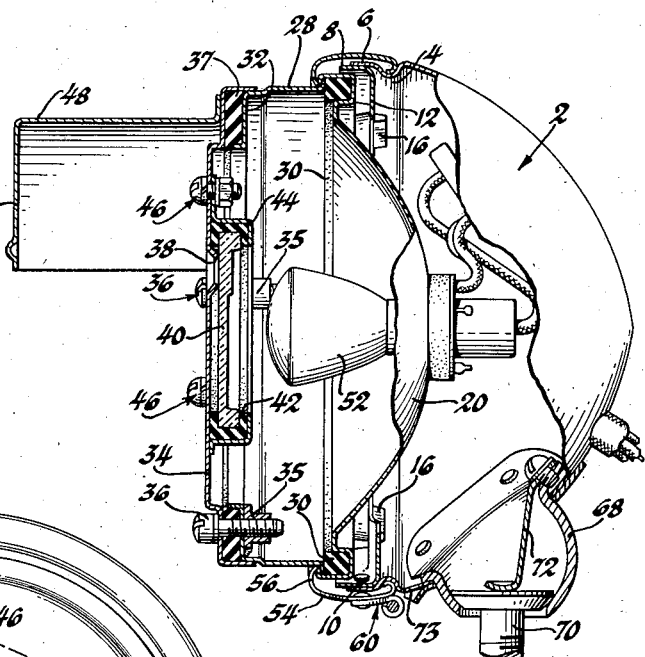
Figure 1 is a side elevation of one embodiment with parts broken away and shown in section.
Figure 2:
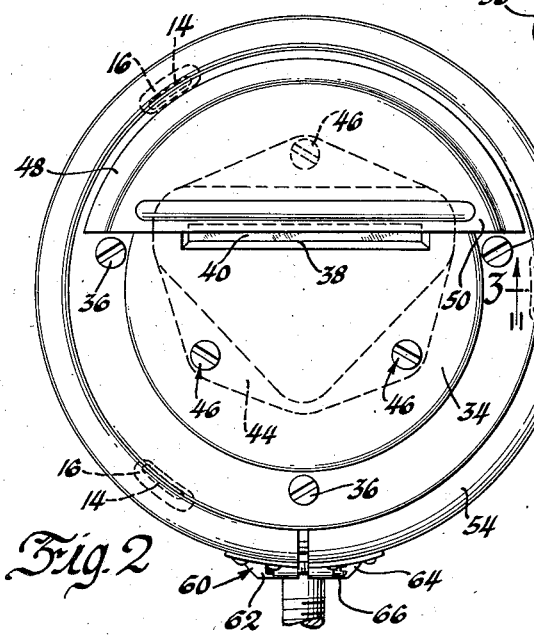
Figure 2 is a front elevation of the lamp of Figure 1.
Figure 4:
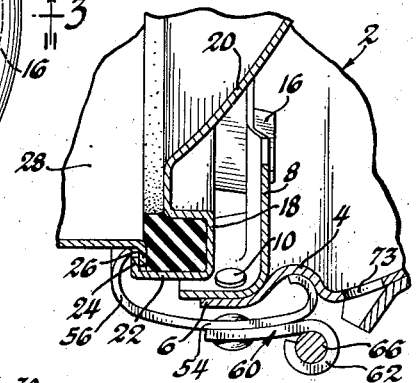
Figure 4 is an enlarged sectional view of a portion of Figure 1.

The support 28 constitutes a cylindrical forward extension on the reflector and is provided adjacent its front end with an inwardly extending flange 32 to which a door or opaque panel 34 is adapted to be removably secured by means such as the screws 36 with nuts 35 which may be secured as by welding to the flange 32. The door 34 and flange 32 of support 28 are formed with oppositely extending peripheral flanges as shown in Figure 1 to position a resilient gasket 37 of rubber or the like which is adapted to be clamped between the support 28 and door 34 to seal the joint between these parts.

The door 34 is provided with a window consisting of a horizontal slot 38 which is adapted to be closed by a lens 40 of suitable light transmitting material which may be mounted by a resilient sealing gasket 42 in a frame 44 which is detachably secured to the inner side of the door 34 by means such as the screw and nut indicated generally at 46. A substantially semi-cylindrical or arc-shaped hood or shield 48 with the front end thereof closed by a vertical wall 50 is mounted as by welding on the front side of the door 34 with the lower edges of the hood in a horizontal plane which is substantially on a line with the horizontal center line of the window slot 38.

A light source such as the usual electric light bulb 52 is mounted within the reflector 20 by means of any standard form of socket mounting such as permits removal and insertion of the bulb from the front side of the reflector, and it will be apparent that the light rays from the bulb will be projected only through the relatively narrow horizontal window slot 38 and then prevented from upward diversion and shielded from above by the hood 48. The relative locations and dimensions of the slot 38 and hood 48 may be readily designed, together with the optical characteristics of the lens 40, to provide for whatever light intensity and area of illumination may be desired.

The blackout unit assembly which was mentioned in the objects of the present invention will be now understood from the foregoing description to consist of the reflector 20, the extension support 28, the door 34 with hood 48, and the parts associated therewith. All of these parts are adapted to be assembled together as a separate and practically self-contained unit which is adapted to be substituted, as mentioned heretofore, for a standard lighting unit. It will therefore be understood that the lamp housing 2 together with the mounting ring 8 is preferably of standard construction to receive a standard lighting unit such as the present sealed-beam type which is well known to those skilled in the art. It is furthermore desirable that the blackout unit assembly may be secured to the lamp housing 2 by the standard elements which are ordinarily used in connection with the standard lighting units.

In the embodiment of Figures 1 to 4, one known type of standard securing means for mounting the blackout unit assembly in the lamp housing has been shown as consisting of the split clamping ring or bezel 54 having the front edge extending inwardly as at 56 to engage the blackout unit assembly adjacent the joint between the reflector 20 and support 28 and having the rear edge thereof rolled inwardly to engage within the shallow groove 4 in the lamp housing 2. The clamping ring or bezel 54 is adapted to be contracted to secure the blackout unit assembly to the lamp housing by the usual fastening means indicated generally at 60 which includes lugs 62 and 64 secured as by rivets to the spaced ends of the clamping ring or bezel which may be drawn together by screw 66 extending loosely through one lug into threaded engagement with the other lug.

The lamp housing 2 has been shown as provided with a mounting bracket 68 to receive a mounting bolt 70 which may be held in position within the bracket by the spring 72 prior to actual assembly of the lamp housing on the vehicle. The housing 2 has also been shown as provided with a drain hole 73 for such moisture as might accumulate in the housing.

Figure 5:
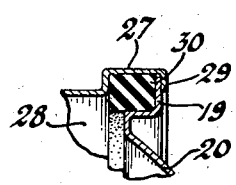
Figures 5 and 6 are sections showing modifications of the gasket mounting such as shown in Figure 3.
Figure 6:
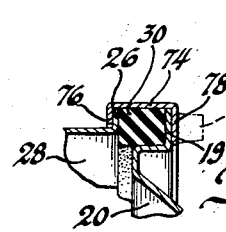

Figures 5 and 6 show alternative methods of securing the reflector 20, support 28 and gasket 30 together. In Figure 5 the support 28 is provided with an offset flange portion 27 which extends rearwardly with the rear edge thereof bent or spun over the adjacent edge of an offset flange 19 on reflector 20 as indicated at 29. In Figure 6, the support 28 is formed with the flange 26 (such as shown in Figure 3) while the reflector 20 is provided with the offset flange 19 (such as shown in Figure 5) and a separate ring 74 is adapted to have the opposite edges thereof bent or spun over the flanges 26 and 19 as indicated respectively at 76 and 78 with the positioning lug 16 secured as indicated diagrammatically in dotted lines to the edge 78 of the ring 74.

Before proceeding to the description of the embodiment shown in Figures 7 to 10, it is desired to point out as mentioned in the objects of the present invention that the construction described above provides for the ready replacement of the light source or bulb 52 without removal of the blackout unit assembly from the lamp housing 2. As will be apparent the light bulb 52 will be readily accessible by removal of the screws 36 and the door 34 without removing the reflector 20 and support 28 or disassembling any of parts mounted on or carried by the door 34. It will also be apparent that the detachable connection of the frame 44 to the door 34 facilitates the repair or replacement of the lens 40, and that the provision of the several gaskets 30, 37 and 42 prevents the entrance of moisture, dust and other foreign matter such as might, for instance, damage or reduce the efficiency of the reflecting surface of the reflector 20.

The embodiment of Figures 7 to 10 is generally similar to that described above and differs therefrom primarily in the relative dimensions of certain parts of the blackout unit assembly which is adapted for use with a further standard type of lamp housing and securing means for a standard lighting unit as will now be explained. In this embodiment the lamp housing 2' is formed with the circumferential channel 4' with the integral inwardly extending flange portion 12' which corresponds in relative location and function to the portion 12 of the ring 8 in the first embodiment. It will be understood that the flange portion 12' is preferably provided with spaced openings to receive radial positioning lugs on the reflector as previously described and as shown in the form of Figures 1 to 4.

The blackout unit assembly consists primarily of the reflector 20' secured to the cylindrical extension support 28' with the interposed gasket 30' and the door 34' detachably secured to support 28' by screws 36' with the interposed gasket 37'. The frame 44' with gasket 42' and lens 40' is detachably secured to the door 34' by the screws 46' and the door 34' has welded to it the hood 48' to prevent upward diversion of light rays from the bulb 52' mounted in the reflector 20'. All of these parts of the blackout unit assembly correspond to similar elements in the embodiment of Figures 1 to 4.

The standard type of securing means shown in Figures 7 to 10 includes a separate retaining ring 80 having a rolled front edge or bead 81 which is adapted to engage the blackout unit assembly adjacent the joint between the reflector 20' and support 28' with means such as screws 82 to secure the retaining ring 80 to the lamp housing 2' and hold the reflector 20' against the flange portion 12'. A finish ring or bezel 84 is provided to conceal and protect a portion of the ring 80 and the screws 82. This bezel 84 is provided with a rolled rear edge to engage within the channel 4' of the lamp housing and is adapted to be clamped in position by the screw 86 which cooperates with lugs 88 and 90 on the adjacent ends of the bezel which may overlap and conceal the screw and lugs as shown particularly in Figure 9 with a slot 92 adjacent one end of the bezel to provide for access to the head of the screw 86.

With reference to the embodiment of Figures 7 to 10 it will be understood that the lamp housing 2', retaining ring 89 and bezel 84 and the parts associated directly therewith are preferably of standard construction such as known in the art and adapted to be ordinarily employed with a standard lighting unit such as the present sealed beam type for which the blackout unit assembly described herein may be readily substituted whenever desired.

Although we have herein shown and described only two embodiments of our invention it is contemplated that further embodiments thereof together with various modifications will be obvious to those skilled in the art within the scope of our invention as set forth in the claims appended hereto.

We claim:

1. In a military vehicle headlamp unit, in combination, an incandescent bulb and a casing comprising a reflector body, an extension ring, and a face plate, and including a peripheral mounting rim, the mounting rim being unitary with the reflector; the extension ring joined to the mounting rim and provided with cooperating flanges and a sealing gasket, the face plate being of opaque material having a marginal sealing flange adapted to seal against the extension ring, clamping means to secure said face plate to the ring, the face plate having a relatively long, narrow, horizontal slot to emit light from the bulb within the reflector housing; a lens mounted on the face plate and positioned behind the slot in the face plate, the unit being provided with a hood extending a substantial distance forwardly from the face plate and located above the horizontal slot, said hood including a semi-cylindrical curved top surface, a straight horizontal front edge, straight horizontal side edges in the same plane as the front edge, all of the edges, both side and front, being located at the approximate level of the horizontal slot of the face plate.

2. In a military vehicle headlamp unit, in combination, an incandescent bulb and a casing comprising a reflector body, an extension ring, and a face plate, and including a peripheral mounting rim, the face plate being of opaque material having a relatively long, narrow, horizontal slot to emit light from the bulb within the reflector housing; a lens mounted on the face plate and positioned behind the slot in the face plate, the unit being provided with a hood extending a substantial distance forwardly from the face plate and located above the horizontal slot, said hood including a curved semi-cylindrical top surface, a straight horizontal front edge, straight horizontal side edges in the same plane as the front edge, all of the edges, both side and front, being located at the approximate level of the horizontal slot of the face plate to permit light rays to be projected forwardly and downwardly from the slot and to shield the slot from observation from above.

3. In a military vehicle headlamp unit, in combination, an incandescent bulb and a casing comprising a reflector body, an extension ring, and a face plate, the reflector comprising a parabolic metal casing including a peripheral mounting rim having opposed faces at its front edge and arranged to house the incandescent bulb; the mounting rim being unitary with the reflector, the extension ring being joined to the mounting rim, cooperating flanges and a sealing gasket between said rim and ring, the face plate being of opaque material having a marginal sealing flange adapted to seal against the extension ring and having a relatively long, narrow, horizontal slot to emit light from the bulb within the reflector housing; a lens mounted on the face plate and positioned behind the slot in the face plate, said lens having a marginal rubber gasket to seal the housing against entrance of foreign substances; the lens including a deeply extended portion extending across and beyond the center of the face plate to a point opposite from the slot and remote from the filament of the incandescent bulb, to form a relatively large heat-dissipating surface of the lens whereby the heat generated by the bulb will not be concentrated on any portion of the rubber sealing gasket surrounding said lens; the unit being provided with a hood extending a substantial distance forwardly from the face plate and located above the horizontal slot, said hood including a curved top surface, a straight horizontal front edge, straight horizontal side edges in the same plane as the front edge, all of the edges, both side and front, being located at the approximate level of the horizontal slot of the face plate.

ROBERT N. FALGE.
HOWARD C. MEAD.